March 20, 1962 R. W. FRENCH 3,026,428
LOW FREQUENCY PICKUP
Filed Oct. 28, 1959

INVENTOR
Richard W. French
Synnestvedt & Lechner
ATTORNEYS 3,026,428
LOW FREQUENCY PICKUP
Richard W. French, Johnsville, Pa., assignor to Tinius Olsen Testing Machine Company, Willow Grove, Pa., a corporation of Pennsylvania
Filed Oct. 28, 1959, Ser. No. 849,254
3 Claims. (Cl. 310—19)

This invention relates to vibration pickups and in particular relates to a vibration pickup having a very low frequency response.

Pickups of the kind in question ordinarily comprise a coil element and a core or magnet element, the magnet usually being supported by spring means with the coil being fixed to the frame or housing. The spring provides for relative motion between the coil and magnet, such motion causing a signal to be generated in the coil which is used to drive an indicator or some other like mechanism.

In vibration analysis and in balancing work it is often highly desirable to employ an inertia-type pickup to sense vibration in the low frequency range, for example, from ½ to 200 c.p.s. Heretofore, at least insofar as I am aware, it was impossible to use an inertia-type pickup for such frequencies with any reasonable degree of accuracy. The difficulties encountered are, for example, that the pickup would not operate at the frequency of the vibrating part with which it is associated and that the signal output would be so distorted or of such a magnitude so as to be useless. Furthermore, in using conventional pickups for balancing work at such frequencies, there is often a varying phase relationship between the pickup vibration and the unbalance of the part which is highly undesirable because it is impossible to accurately determine the location of unbalance.

The principal object of the invention is to provide a pickup which will operate and produce reliable and accurate vibration indications in the lower frequency ranges. The foregoing is accomplished by virtue of my discovery that desired low frequency operation can be obtained by minimizing or reducing the effects of gravity on the vibrating magnet.

Thus, the invention contemplates a vibration pickup having relatively movable coil and magnet elements together with magnetic material disposed closely adjacent to and fixed with respect to the magnet so as to be magnetizable with motion thereof, the magnetization reducing or minimizing the effects of gravity and causing the pickup to respond in the low frequency range.

Figure 1:
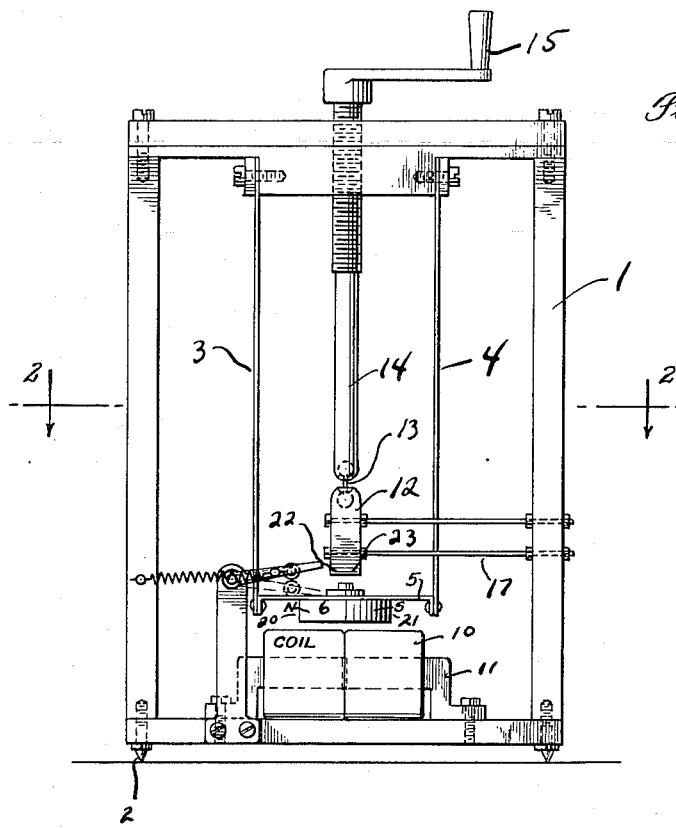
Figure 2:
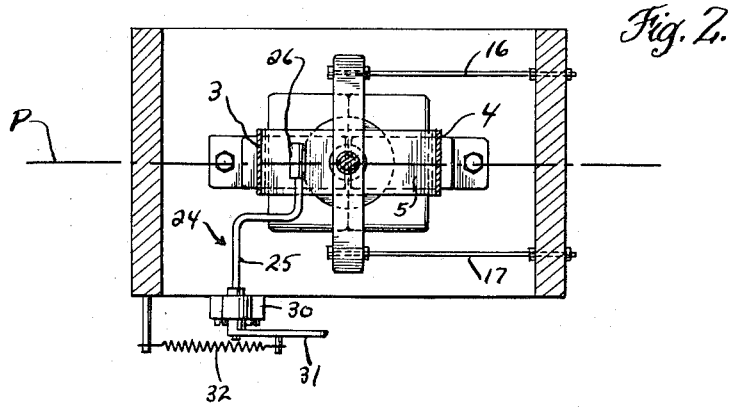

The invention will be understood from the following description and drawings wherein:

FIGURE 1 is a side elevational view of a typical structure incorporating the invention; and FIGURE 2 is a plan view taken along the lines 2—2 of FIGURE 1.

In FIGURE 1 the housing or frame of the unit is designated by the numeral 1. The housing is generally rectangular in shape and on the bottom is provided with cone-shaped mounts 2 which serve as a means for placing the pickup on a part to be tested. As shown, the two wider sides of the housing are open; however, the housing may be constructed so as to present a closed structure.

On the top of the housing there are fastened two strip-like spring elements 3 and 4 which, as seen in FIGURE 2, are generally rectangular in shape. To the bottom of the springs is fixed a bridge member 5 on which is secured the permanent magnet 6. The springs, bridge and the fastening devices for attaching the magnet to the bridge are all preferably made of non-magnetic material.

A coil element 10 is located just below the magnet.

The coil element 10 is the air-core type and is fixed to the housing by the bracket 11 which extends through the aperture or void in the center of the coil. An air-core type coil is preferred because there is no possibility of magnet attraction between the magnet 6 and an iron core as might be the case where the non-air-core type of coil is used, particularly at low frequencies.

As will be apparent the springs 3 and 4 support the magnet to permit relative motion between the magnet and the coil element. The direction of this motion is to the left and right as viewed in FIGURE 1 and in the vertical plane P (FIGURE 2). The magnet and coil function in the usual manner, that is to say, the flux lines from the magnet cut the turns in the coil so as to develop a signal or voltage which in the normal case is substantially sinusoidal. This signal may be taken from the coil by means of leads (not shown) and used for driving an indicating device.

Just above the magnet is a piece of magnetizable material 12. A swivel connection 13 joins the material 12 wtih one end of a screw 14. The screw 14 is threaded in the frame 1 and may be rotated by means of a handle 15. When the handle 15 is rotated, the screw is moved along its axis, i.e., up or down depending upon the direction of the rotation of the handle. The swivel connection 13 permits the magnetic material 12 to be moved up and down with the screw and also permits the screw to rotate relative to the material. The material 12 is connected to the housing by means which permit the same to move axially with the screw but to be non-rotatable. This takes the form of flexible rods, there being two pairs of rods, one pair being designated by 16 and the other by 17. As shown, the rods are fastened to both the magnetic mateiral 12 and to the frame 1. The rods and the means for fastening the same to the material 12 and the frame 1 are preferably non-magnetic.

The effect of the magnetizable material 12 on the magnet 6 will be explained following. Since the magnet 6 is of the permanent type, lines of flux are continually flowing out of north pole and into the south pole. For purposes of explanation, the left-hand side 20 of the magnet may be considered the north pole and the right-hand side 21, the south pole. The lines of flux from the magnet will cut the magnetizable material 12 and polarize the same. The left-hand side of the material, for example, the corner 22, becomes a south pole and the corner 23 becomes a north pole. Thus there will be an attraction between the magnet and the magnetizable material 12, the strength of the attraction being proportional to the pole strength and inversely proportional to the distances therebetween. By moving the magnetizable material 12 close to the magnet, the force may be increased and moving the material 12 away from the magnet decreases the strength. Since the magnet is attracted in an upward direction, it will be apparent that this force of attraction tends to overcome or minimize the effects of gravity which tend to move the magnet down.

In actual operation the total amplitude of the relative motion between the coil and magnet is very small and thus, for all practical purposes, the attraction strength remains substantially the same.

The magnet in FIGURE 1 is in the neutral position, that is to say, the position it assumes under non-vibratory conditions. With vibration the magnet may move, say, to the left, then back to neutral, then to the right and back to neutral again to complete a full cycle of vibration. It will be understood that under certain conditions of vibration the magnet may remain motionless while the coil (and frame) move left and right and that this produces the same effect as if the coil were moving as a velocity pickup.

Mounting the magnetizable material 12 so that it can be moved toward and away from the magnet is important from two standpoints. The first is that it provides for setting the optimum frequency range within which it is desired to operate the device and, secondly, it provides a means for tuning the suspension system, i.e., the springs, bridge, magnet, etc. Generally speaking, the closer the magnetizable material is to the magnet 6, the more accurate the response at the lower frequencies. Thus the instrument may be set for operation within some range of low frequencies. For tuning purposes, it is preferred that the threads of the screw 14 be of the micrometer type so that the material 12 can be very accurately placed with respect to the magnet and by such adjustment the suspension sysem may be tuned to reasonance with the frequency part with which the instrument is being used.

It will be noted that the magnet and springs are freely movable and when the instrument is not in use or being transported, it is preferable that the magnet be locked in position. For this purpose I have provided a locking mechanism 24. This comprises a crank 25 having a rubber bumper 26, the crank being mounted on a standard 30 secured to the frame 1. The crank 25 is operated by a handle 31 connected with an over-the-center spring 32. In FIGURE 1 the rubber bumper 26 is disengaged from the bridge 5 and the crank is held in this position by means of the spring 32. If the handle is moved so that the crank assumes the position indicated by the dotted lines, the bumper 26 will engage the bridge 5 and hold the same in fixed position.

I claim:

1. An inertia-type pickup having a low frequency response comprising: a frame; a pair of strip-like, spaced-apart springs respectively connected with the top of said frame and extending downwardly therefrom; a magnet connected with the lower ends of said springs; a coil mounted on said frame and disposed below and adjacent to said magnet to receive flux therefrom to develop an electrical signal; magnetic material disposed interjacent said springs and above said magnet in close proximity thereto so as to be magnetizable with motion of said magnet; a screw rotatably mounted on said frame, rotation of the screw causing the same to move along its axis; means interconnecting said screw and said magnetic material providing for the material to move axially with the screw and for the screw to rotate relative to the magnetic material; and yieldable means interconnecting said material and said frame and supporting the material to be non-rotatable and to be movable axially with said screw.

2. A construction in accordance with claim 1 wherein said coil is the air-core type.

3. An inertia-type pickup having a low frequency response comprising: a frame; a pair of strip-like, spaced-apart springs respectively connected with the top of said frame and extending downwardly therefrom; a magnet connected with the lower ends of said spring; a coil mounted on said frame and disposed below and adjacent to said magnet to receive flux therefrom to develop an electrical signal; magnetic material disposed interjacent said springs and above said magnet in close proximity thereto so as to be magnetizable with motion of said magnet; and means interconnecting said magnetic material with said frame and constructed to provide for raising and lowering the magnetic material with respect to said magnet and for the material to remain fixed while the magnet is moving.

References Cited in the file of this patent

UNITED STATES PATENTS

| | | |
|---|---|---|
| 2,562,983 | Clewell | Aug. 7, 1951 |
| 2,657,374 | Bardeen | Oct. 27, 1953 |